United States Patent [19]  [11] Patent Number: 4,525,530
Mathumoto et al.  [45] Date of Patent: Jun. 25, 1985

[54] THERMOPLASTIC RESIN COMPOSITIONS

[75] Inventors: Sigemi Mathumoto, Takasago; Hidetaka Kubota; Fumiya Nagoshi, both of Kobe, all of Japan

[73] Assignee: Kanegafuchi Kagaku Kogyo Kabushiki Kaisha, Osaka, Japan

[21] Appl. No.: 525,433

[22] Filed: Aug. 22, 1983

Related U.S. Application Data

[63] Continuation of Ser. No. 271,204, Jun. 8, 1981, abandoned.

[30] Foreign Application Priority Data

Jun. 28, 1980 [JP] Japan ................... 55-88398

[51] Int. Cl.$^3$ ................... C08L 51/04; C08L 55/02
[52] U.S. Cl. ................... 525/84; 525/86
[58] Field of Search ................... 525/84, 86

[56] References Cited

U.S. PATENT DOCUMENTS

| | | | |
|---|---|---|---|
| 2,802,809 | 8/1957 | Hayes | 525/86 |
| 3,053,800 | 9/1962 | Grabowski | 525/86 |
| 3,678,132 | 7/1972 | Isogawa | 525/84 |
| 3,922,320 | 11/1975 | Love | 525/84 |
| 3,969,469 | 7/1976 | Love | 525/84 |
| 4,041,106 | 8/1977 | Ide | 525/84 |
| 4,294,946 | 10/1981 | Minematsu et al. | 526/80 |

*Primary Examiner*—Allan M. Lieberman
*Attorney, Agent, or Firm*—Armstrong, Nikaido, Marmelstein & Kubovcik

[57] ABSTRACT

Thermoplastic resin compositions which comprise 20-70 parts by weight of a polyvinyl chloride resin and 80-30 parts by weight of a mixed composition of the following copolymers (A) and (B) at the following ratio:

(A) 90-50% by weight of a copolymer which comprises 65-90 parts by weight of α-methylstyrene with 35-10 parts by weight of acrylonitrile and 0-5 parts by weight of a copolymerizable vinyl monomer and contains 30 parts by weight or more of a component having an α-methylstyrene content of 82% by weight or higher; and (B) 10-50% by weight of a graft copolymer obtained by reacting 35-80% by weight of a conjugated diene rubber and 65-20% by weight of a monomer comprising a monovinyl aromatic compound, an unsaturated nitrile compound or an alkyl methacrylate.

These compositions have greatly improved heat resistance, especially resistance to heat distortion, and impact resistance over those of polyvinyl chloride resins.

1 Claim, No Drawings

THERMOPLASTIC RESIN COMPOSITIONS

This application is a continuation, of application Ser. No. 271,204, filed June 8, 1981, now abandoned.

BACKGROUND OF THE INVENTION

1. Field of the Invention

This invention relates to thermoplastic resin compositions having good heat resistance or a combination of good heat resistance and impact resistance. More particualrly, it relates to resin compositions which comprise a polyvinyl chloride resin and a mixture of a copolymer (A) containing α-methylstyrene as a main component and a graft copolymer (B) obtained by graft polymerization of a conjugated diene rubber with an aromatic vinyl compound and a unsaturated nitrile compound or an alkyl methacrylate, and it relates to thermoplastic resin compositions having greatly improved resistance to heat distortion and impact resistance over those of polyvinyl chloride resins.

2. Description of the Prior Art

Polyvinyl chloride resins have excellent mechanical characteristics and electrical characteristics and possess characteristic physical properties such as transparency, flame retardency etc. as well as versatile working characteristics, and thus they are extensively employed as useful plastic materials in various fields of applications. However, the resins of this type have thermal distortion temperature of 65°–70° C., and therefore their use is limited where the articles are subjected to high temperature environments, for example, pipes for hot water, automobile interior parts etc. where the indoor temperature may become very high and the like.

Heretofore, as methods to improve this disadvantage of the polyvinyl chloride resins, there have been various methods provided, e.g., those involving incorporating an AS (acrylonitrile - styrene) resin, an ABS (acrylonitrile - butadiene - styrene) resin and an MBS (methyl methacrylate - butadiene - styrene) resin, respectively, to polyvinyl chloride resins, and there has also been proposed a method which comprises introducing α-methylstyrene monomer as one component of these resins in order to further enhance the effect to improve heat resistance. For example, Japanese Patent Publication No. 24867/1970 describes that a composition having high heat resistance is obtained by blending a polyvinyl chloride resin with a copolymer of methyl methacrylate, acrylonitrile, styrene and α-methylstyrene and a butadiene containing polymer. However, the amount of α-methylstyrene in the copolymer is merely 45% by weight at best and heat resistance is not adequate. Further, Japanese Patent Publication No. 18101/1973 describes a method which comprises incorporating a resin (A) obtained by copolymerizing a monomer mixture consisting of 5–50% of methyl methacrylate, 3–30% of acrylonitrile and 30–80% of α-methylstyrene together with a butadiene containing graft polymer into a polyvinyl chloride resin. However, by this method, it can be estimated from the reactivity on copolymerization that it is practically impossible to make the α-methylstyrene content in this copolymer (A) 70% by weight or higher even locally.

We have discovered that high heat resistance which has not been achieved by the above-described prior art techniques can be obtained by incorporating a copolymer (A) which is a copolymer comprising 65–90 parts by weight of α-methylstyrene with 35–10 parts by weight of acrylonitrile and 0–5 parts by weight of a copolymerizable vinyl monomer or monomers and containing 30 parts by weight or more of a component having an α-methylstyrene content of 82% by weight or higher, and a graft copolymer (B) obtained by reacting 35–80% by weight of a conjugated diene rubber with 65–20% by weight of a monomer comprising a monovinyl aromatic compound and a unsaturated nitrile compound or an alkyl methacrylate into a polyvinyl chloride resin, and thus accomplished this invention.

SUMMARY OF THE INVENTION

Accordingly, this invention provides a thermoplastic resin composition which comprises 20–70 parts by weight of a polyvinyl chloride resin and 80–30 parts by weight of a mixed composition of the following copolymers (A) and (B) at the following mixing ratio:

(A) 90–50% by weight of a copolymer which comprises 65–90 parts by weight of α-methylstyrene with 35–10 parts by weight of acrylonitrile and 0–5 parts by weight of a copolymerizable vinyl monomer or monomers and contains 30 parts by weight or more of a component having an α-methylstyrene content of 82% by weight or higher; and (B) 10–50% by weight of a graft copolymer obtained by reacting 35–80% by weight of a conjugated diene rubber and 65–20% by weight of a monomer or monomers comprising a monovinyl aromatic compound, a unsaturated nitrile compound or an alkyl methacrylate.

DESCRIPTION OF THE PREFERRED EMBODIMENT

One component of the compositions of this invention is an α-methylstyrene containing copolymer (A). Said copolymer is used to impart heat resistance to the intended composition. Said copolymer may be obtained as follows: α-Methylstyrene monomer is charged first into a reaction system for emulsion polymerization and, after making the system fully emulsified, acrylonitrile is continuously added dropwise with a very small amount each time, while in the polymerization system the proportion of the α-methylstyrene monomer and the acrylonitrile monomer is always maintained at such great excess of α-methylstyrene as a weight ratio of 90/10 or higher, more preferably 95/5 or higher, thereby the desired copolymer is obtained. In this case, α-methylstyrene to be charged first is at least 65 parts by weight and up to 90 parts by weight. With an amount of less than 65 parts by weight, the effect to enhance heat resistance is inadequate, while with an amount of more than 90 parts by weight, compatibility with polyvinyl chloride resins is lowered. The amount of acrylonitrile to be added dropwise continuously is at least 10 parts by weight and up to 35 parts by weight. With an amount of less than 10 parts by weight, the percent conversion to polymer is reduced, while with an amount of more than 35 parts by weight, the resulting copolymer tends to be colored on heating and also brings about coloration when mixed with a polyvinyl chloride resin. The α-methylstyrene monomer to be charged first may contain up to 10% by weight based on the α-methylstyrene monomer of a unsaturated nitrile compound, lower alkyl esters of methacrylic acid and acrylic acid and the like. The acrylonitrile monomer to be continuously added dropwise may contain up to 15% by weight based on the acrylonitrile monomer of a monovinyl aromatic compound, an α-substituted type monovinyl aromatic compound, lower alkyl esters of methacrylic acid and acrylic acid and the like. As a third component other than α-methylstyrene and acrylonitrile, it is possible to employ up to 5 parts by weight of the above-mentioned vinyl monomer substantially without adversely affecting heat resistance or impact resistance, but when it is incorporated in an amount beyond the above range, the heat resistance of the resulting copolymer is lowered and thus not desirable.

Another component of the compositions according to this invention is a graft copolymer (B) utilizing a conjugated diene rubber. Said copolymer is employed to impart impact resistance to the intended composition. The composition of said copolymer is such that the conjugated diene rubber comprises 35–80% by weight and the total of the monovinyl aromatic compound, the unsaturated nitrile compound or the alkyl methacrylate comprises 65–20% by weight, and it is preferred that the proportion of the monovinyl aromatic compound to the unsaturated nitrile compound and/or the alkyl methacrylate is 85–20:15–80 on the weight basis. The reason is that with the amount of the conjugated diene rubber of less than 35% by weight, it is difficult to obtain the desired impact resistance. On the other hand, if the amount exceeds 80% by weight, compatibility with polyvinyl chloride resins is inadequate and thus it is difficult to obtain a uniform molded product. Further, it is also because with the amount of the conjugated diene rubber in excess, the effect to improve heat resistance is reduced. Examples of the conjugated diene rubber to be used in said graft copolymer (B) include polybutadiene, polyisoprene, butadiene - styrene copolymers etc., but not restricted thereto. Also, examples of the monovinyl aromatic compound include, in addition to styrene, α-methylstyrene, chlorostyrene, t-butylstyrene etc. Examples of the unsaturated nitrile compound include acrylonitrile as well as methacrylonitrile etc. Examples of the alkyl methacrylate include methyl methacrylate, ethyl methacrylate etc.

The above-mentioned copolymer (A) and graft copolymer (B) may be preferably obtained by emulsion polymerization, but the type of polymerization is not limited to emulsion polymerization. Emulsion polymerization may be carried out in a conventional manner. For example, the above-mentioned monomer mixture may be reacted in the presence of a free-radical initiator in an aqueous dispersion. As the free-radical initiator, there may be mentioned peroxides such as potassium persulfate, ammonium persulfate, cumene hydroperoxide etc. In addition, other additives, e.g. a polymerization cocatalyst, a chain transfer agent, an emulsifier etc., which have heretofore been conventionally employed in emulsion polymerization may be appropriately chosen and used.

The heat resistance and impact resistance the products molded in of the compositions according to this invention can vary depending not only on the compositions of the copolymer (A) and the graft copolymer (B) respectively but also on the mixing ratio thereof as well as the mixing ratio of those with a polyvinyl chloride resin. Therefore, the mixing ratios may be selected according to the desired heat resistance and impact resistance of the molded articles.

For obtaining the intended heat resistant resin composition according to this invention, the total amount of the copolymer (A) and the graft copolymer (B) is suitably 30–80 parts by weight, more preferably 30–70 parts by weight, in the total composition resulting from the incorporation thereof in a polyvinyl chloride resin. With the amount of less than 30 parts by weight, it is inadequate for enhancing the heat resistance of the polyvinyl chloride resin, while with the amount of more than 80 parts by weight, although satisfactory heat resistance is imparted, the working temperature becomes higher, which induces coloration of the polyvinyl chloride resin due to heat, and thus is not desirable. In order to successfully achieve this invention, the mixing ratio on the weight basis of the copolymer (A) and the graft copolymer (B) is preferably 90/10–50/50, more preferably 80/20–60/40. Where the copolymer (A) exceeds 90% by weight, although the heat resistance of the polyvinyl chloride resin is effectively enhanced, the impact resistance is lowered. On the other hand, with the amount of less than 50% by weight, the effect to enhance the heat resistance is small and also great reduction in tensile strength is resulted. Mixing of the copolymer (A) and the graft copolymer (B) may be effected in a conventional manner.

When the compositions of this invention are subjected to working, commonly employed heat stabilizers, lubricants, pigments, fillers etc. are used according to necessity. Specifically, as the heat stabilizer, there may be employed, for example, organic tin based stabilizers such as organic tin maleates, organic tin laurates, organic tin mercaptides etc., lead salt based stabilizers such as white lead, tribasic lead sulfate, dibasic lead phosphite, dibasic lead phthalate, tribasic lead maleate, lead silicate and its silica gel co-precipitate etc., or metal soap stabilizers, e.g. lead, cadmium, barium, zinc, calcium etc. with higher fatty acids. It is also possible to use, in combination with the above, epoxy compounds such as epoxylated soybean oil, epoxylated linseed oil etc., organic phosphite compounds such as triphenyl phosphite, trinonylphenyl phosphite etc. As the lubricant, there may be employed saturated fatty acids, such as stearic acid, palmitic acid etc., and ester compounds thereof, natural waxes such as carnauba wax, candelilla wax etc., synthesized waxes such as ethylene bis-stearylamide, polyethylene oxide, low molecular weight polyethylene etc., liquid paraffin etc. Further as the fillers, calcium carbonate, clay, silica, talc, carbon black etc. as well as flame retarders such as amtimony trioxide, metastannic acid etc. may be added according to necessity. Still further, it is also possible to use a small amount of a plasticizer such as phthalic acid esters, adipic acid esters, sebacic acid esters, phosphoric acid esters, polyesters etc.

This invention is more particularly described by the following examples, in which all the "parts" mean "parts by weight".

Examples and Comparative Examples (1) Production of Copolymers (A)

The following materials were charged into a reactor equipped with a stirrer.

| Water | 250 parts |
| Sodium laurate | 3 parts |
| Sodium formaldehyde sulfoxylate | 0.4 part |
| Ferrous sulfate | 0.0025 part |
| Disodium ethylenediaminetetraacetate | 0.01 part |

After flushing with purified nitrogen and subsequent heating with stirring at 60° C. in a nitrogen stream, the monomer mixture (I) indicated in Table 1 was charged.

After fully emulsifying and mixing the system, the monomer mixture (II) indicated in Table 1 was continuously added dropwise. On completion of this addition, stirring was further continued at 60° C., and the polymerization was terminated. The latex in the course of the reaction was taken as samples, and the composition was analyzed and the conversion to polymer was measured.

The percent conversion to polymer of the thus obtained copolymer and its composition in the course of the reaction are given in Table 1. The copolymers of this invention, as those indicated by A-1 to A-6 in Table 1, contain therein a copolymer containing 82% by weight more of α-methylstyrene. On the other hand, the case where the amount of α-methylstyrene to be charged first was 95 parts by weight was given as Comparative Example A-7, in which the conversion to polymer remarkably dropped and therefore further investigation was stopped. In the rest of the comparative examples, polymerization was effected either by charging 60 parts by weight of α-methylstyrene first or continuously adding dropwise a uniform mixture of α-methylstyrene and acrylonitrile from the start. In either case, it was difficult to make the α-methylstyrene content 82% by weight or higher even locally, and it was believed that a 1:1 alternating copolymer of α-methylstyrene - acrylonitrile or α-methylstyrene - methyl methacrylate comprised the greater part.

After flushing with purified nitrogen and subsequent heating with stirring at 60° C. in a nitrogen stream, 40 parts of the following monomer mixture was continuously added dropwise together with 0.3 part of cumene hydroperoxide. On completion of the addition, stirring was further continued at 60° C. and then the polymerization was terminated.

B-1: 12 parts of acrylonitrile and 28 parts of styrene
B-2: 5 parts of acrylonitrile, 10 parts of methyl methacrylate and 25 parts of styrene (3) Production of Thermoplastic Resin Compositions The copolymer (A) and graft copolymer (B) produced as described above were mixed together in the latex form at a solids weight ratio of 75:25, and this mixed latex was, after adding an antioxidant, coagulated with calcium chloride, washed with water, filtered out and dried to obtain a powder composition (C).

EXAMPLE 1

Sixty grams of the thus obtained mixed composition (C) of the copolymer (A) and the graft copolymer (B) and 40 g of polyvinyl chloride (Kanevinyl S-1001, produced by Kanegafuchi Chemical) together with 1 g of dioctyltin maleate, 1 g of dioctyltin mercaptide and 0.3 g of a low molecular weight polyethylene were kneaded on a roll mill heated to 185° C. for 8 minutes.

TABLE 1

| No. | Example | | | | | | Comparative Example | | | |
|---|---|---|---|---|---|---|---|---|---|---|
| | A-1 | A-2 | A-3 | A-4 | A-5 | A-6 | A-7 | A-8 | A-9 | A-10 |
| Monomer Mixture (I) | | | | | | | | | | |
| α-Methylstyrene (pts) | 80 | 75 | 70 | 75 | 70 | 75 | 95 | 60 | — | — |
| Acrylonitrile (pts) | — | — | — | — | 5 | — | — | — | — | — |
| t-Dodecylmercaptan (pts) | 0.2 | 0.2 | 0.2 | 0.2 | 0.2 | 0.2 | 0.2 | 0.2 | — | — |
| Monomer Mixture (II) | | | | | | | | | | |
| Acrylonitrile (pts) | 20 | 25 | 30 | 22 | 22 | 22 | 5 | 40 | 30 | 20 |
| α-Methylstyrene (pts) | — | — | — | 3 | 3 | — | — | — | 70 | 70 |
| Methyl methacrylate (pts) | — | — | — | — | — | 3 | — | — | — | 10 |
| Cumene hydroperoxide (pts) | 0.5 | 0.5 | 0.5 | 0.5 | 0.5 | 0.5 | 0.5 | 0.5 | 0.5 | 0.5 |
| t-Dodecylmercaptan (pts) | 0.2 | 0.2 | 0.2 | 0.2 | 0.2 | 0.2 | 0.2 | 0.2 | 0.2 | 0.2 |
| α-Methylstyrene Content at a Polymer Yield of 40-50 pts. (%)° | 83 | 82 | 82 | 82 | 82 | 82 | 84 | 78 | 68 | 65 |
| Final Conversion to Polymer (%) | 96 | 97 | 96 | 97 | 97 | 97 | 29 | 92 | 96 | 93 |

*Calculated from the elemental analysis of the polymer.

(2) Production of Graft Copolymers (B)

The following materials were charged into a reactor equipped with a stirrer.

| Water | 250 parts |
|---|---|
| Sodium formaldehyde sulfoxylate | 0.2 part |
| Ferrous sulfate | 0.0025 part |
| Disodium ethylenediaminetetraacetate | 0.01 part |
| Polybutadiene | 60 parts |

The sheet treated on the roll mill was pressed at 190° C. and 100 kg/cm² for 15 minutes. The physical properties of the product are shown in Table 2.

As evident from Table 2, Examples C-1 to C-6 exhibit excellent mechanical properties, inter alia, high heat distortion temperature and impact strength. Those using the copolymers A-8, 9 and 10 respectively as the Comparative Examples are poor in heat resistance. That using A-8 shows significant coloration.

TABLE 2

| | Example | | | | | | | Comparative Example | | | |
|---|---|---|---|---|---|---|---|---|---|---|---|
| | C-1 | C-2 | C-2' | C-3 | C-4 | C-5 | C-6 | C-8 | C-9 | C-9' | C-10 |
| Copolymer (A) | A-1 | A-2 | A-2 | A-3 | A-4 | A-5 | A-6 | A-8 | A-9 | A-9 | A-10 |
| Copolymer (B) | B-1 | B-1 | B-2 | B-1 | B-1 | B-1 | B-1 | B-1 | B-1 | B-2 | B-1 |
| Izot Impact Strength*¹ (kg · cm/cm) | 23 | 40 | 41 | 44 | 41 | 37 | 43 | 47 | 43 | 41 | 39 |
| Tensile Strength*² (kg/cm²) | 543 | 535 | 537 | 533 | 538 | 533 | 531 | 535 | 541 | 536 | 535 |

TABLE 2-continued

|  | Example | | | | | | | Comparative Example | | | |
| --- | --- | --- | --- | --- | --- | --- | --- | --- | --- | --- | --- |
|  | C-1 | C-2 | C-2' | C-3 | C-4 | C-5 | C-6 | C-8 | C-9 | C-9' | C-10 |
| Heat Distortion Temp.*[3] (°C.) | 96 | 94 | 94 | 94 | 93 | 93 | 93 | 89 | 90 | 91 | 90 |
| State of Coloration*[4] | No | No | No | No | No | No | No | Yellow | Yellow | No | No |

*[1]ASTM D-256
*[2]ASTM D-636
*[3]ASTM D-648
*[4]Judged by the naked eye observation; No means no coloration.

EXAMPLE 2

Similarly as in Example 1, C-1 of Example 1 and the polyvinyl chloride resin, both in various amounts indicated in Table 3, together with 1 g of dioctyltin maleate, 1 g of dioctyltin mercaptide and 0.3 g of a low molecular weight polyethylene were mixed and treated, to obtain each composition, and properties thereof were measured.

As clear from these results, it can be seen that the compositions of this invention (C-23 to C-28) are excellent both in impact strength and in heat resistance.

TABLE 3

|  | Comparative Example | | Example | | | | | | Comparative Example |
| --- | --- | --- | --- | --- | --- | --- | --- | --- | --- |
|  | C-21 | C-22 | C-23 | C-24 | C-25 | C-26 | C-27 | C-28 | C-29 |
| Copolymer Composition C-2 (pts) | 0 | 20 | 30 | 40 | 50 | 60 | 70 | 80 | 100 |
| Polyvinyl Chloride Resin (pts) | 100 | 80 | 70 | 60 | 50 | 40 | 30 | 20 | 0 |
| Izot Impact Strength (kg · cm/cm) | 3 | 7 | 12 | 21 | 41 | 40 | 37 | 32 | 14 |
| Tensile Strength (kg/cm$^2$) | 560 | 554 | 551 | 547 | 541 | 535 | 532 | 526 | 521 |
| Heat Distortion Temp. (°C.) | 75 | 79 | 82 | 86 | 89 | 94 | 98 | 103 | 114 |

EXAMPLE 3

Sixty grams of each of mixtures of the copolymers (A) and (B) mixed at various ratios indicated in Table 4 and 40 g of the polyvinyl chloride resin were processed similarly as in Example 1 to prepare test specimens.

As can be seen from the values of the physical properties, Examples D-2 to D-5 in which the mixing ratios of the copolymers (A) and (B) are in the range established by this invention have high heat distortion temperature and impact strength. Where the graft copolymer (B) is present too much, the heat distortion temperature cannot be enhanced effectively and also impact strength is reduced. On the other hand, in the range where the graft copolymer is less than 10 parts, it seems there is almost no impact strength.

TABLE 4

|  | Comp. Ex. | Example | | | | Comp. Ex. |
| --- | --- | --- | --- | --- | --- | --- |
|  | D-1 | D-2 | D-3 | D-4 | D-5 | D-6 |
| Copolymer A-2 (pts) | 40 | 50 | 60 | 75 | 90 | 100 |
| Copolymer B-1 (pts) | 60 | 50 | 40 | 25 | 10 | 0 |
| Izot Impact Strength (kg · cm/cm) | 52 | 54 | 61 | 40 | 12 | 2 |
| Tensile Strength (kg/cm$^2$) | 440 | 477 | 508 | 535 | 581 | 610 |
| Heat Distortion Temp. (°C.) | 86 | 89 | 91 | 94 | 98 | 102 |

What is claimed is:

1. A thermoplastic resin composition which comprises 20-70 parts by weight of a polyvinyl chloride resin and 80-30 parts by weight of a mixed composition of the following copolymers (A) and (B) at the following mixing ratio:

(A) 90-50% by weight of a copolymer which is the polymerization product of 65-90 parts by weight of α-methylstyrene with 35-10 parts by weight of acrylonitrile and 0-5 parts by weight of a copolymerizable vinyl monomer or monomers, 30 parts by weight or more of said copolymer having polymer chain units with an α-methylstyrene content of 82% by weight or higher; and (B) 10-50% by weight of a graft copolymer obtained by reacting 35-80 % by weight of a conjugated diene rubber and 65-20% by weight of a monomer or monomers comprising a monovinyl aromatic compound, an unsaturated nitrile compound or an alkyl methacrylate, wherein copolymer (A) is prepared by the following steps comprising:

charging 65 parts by weight or more of α-methylstyrene and 10 parts by weight or less of acrylonitrile and/or copolymerizable vinyl monomer other than α-methylstyrene into the reactor all at once, emulsifying the reactants, and emulsion polymerizing the emulsified monomers while continuously and gradually adding at least 10 and up to 35 parts by weight of acrylonitrile and 15% or less, based on the acrylonitrile, of the copolymerizable vinyl monomer, wherein the weight ratio of α-methylstyrene to monomers other than α-methylstyrene in the reaction system is maintained at 90/10 or higher until the resultant copolymer reaches 40 parts by weight, based on 100 parts by weight of the resulting copolymer.

* * * * *